United States Patent
Chen et al.

(10) Patent No.: US 8,649,310 B2
(45) Date of Patent: Feb. 11, 2014

(54) BASE STATION, MOBILE APPARATUS, AND COMMUNICATION METHOD THEREOF FOR MULTICAST AND BROADCAST SERVICE

(75) Inventors: Chiu-Wen Chen, Taipei (TW); Chun-Yen Hsu, Minxiong Township (TW)

(73) Assignee: Institute for Information Industry, Taipei (TW)

( * ) Notice: Subject to any disclaimer, the term of this patent is extended or adjusted under 35 U.S.C. 154(b) by 924 days.

(21) Appl. No.: 12/764,959

(22) Filed: Apr. 22, 2010

(65) Prior Publication Data

US 2010/0272000 A1 Oct. 28, 2010

Related U.S. Application Data

(60) Provisional application No. 61/171,477, filed on Apr. 22, 2009, provisional application No. 61/256,315, filed on Oct. 30, 2009, provisional application No. 61/258,228, filed on Nov. 5, 2009.

(51) Int. Cl.
  *H04H 20/71* (2008.01)
(52) U.S. Cl.
  USPC .......................................... 370/312; 370/328

(58) Field of Classification Search
  USPC ......... 370/310, 311, 312, 328, 329, 330, 431, 370/432, 442, 443; 455/403, 422.1, 73, 455/550.1, 572, 574
  See application file for complete search history.

(56) References Cited

U.S. PATENT DOCUMENTS

| 2009/0274085 | A1* | 11/2009 | Wang et al. | 370/312 |
| 2011/0032858 | A1* | 2/2011 | Lohmar et al. | 370/312 |
| 2011/0182229 | A1* | 7/2011 | Park et al. | 370/312 |

* cited by examiner

*Primary Examiner* — Obaidul Huq
(74) *Attorney, Agent, or Firm* — Skaar Ulbrich Macari, P.A.

(57) ABSTRACT

A base station, a mobile apparatus, and a communication method thereof for multicast and broadcast service (MBS) are provided. The base station and the mobile apparatus belong to an MBS zone. The base station sets an indicator in a control channel allocation of a frame. The indicator is related to a cell-specific MBS configuration of the base station. The control channel allocation is an allocation that the mobile apparatus has to read when it is in power-saving mode and when it has to receive MBS data. The MBS data is related to the MBS zone. The mobile apparatus reads the indicator in power-saving mode and can derive the cell-specific MBS configuration according to the indicator. The mobile apparatus does not have to search the whole frame to derive the cell-specific MBS configuration.

34 Claims, 13 Drawing Sheets

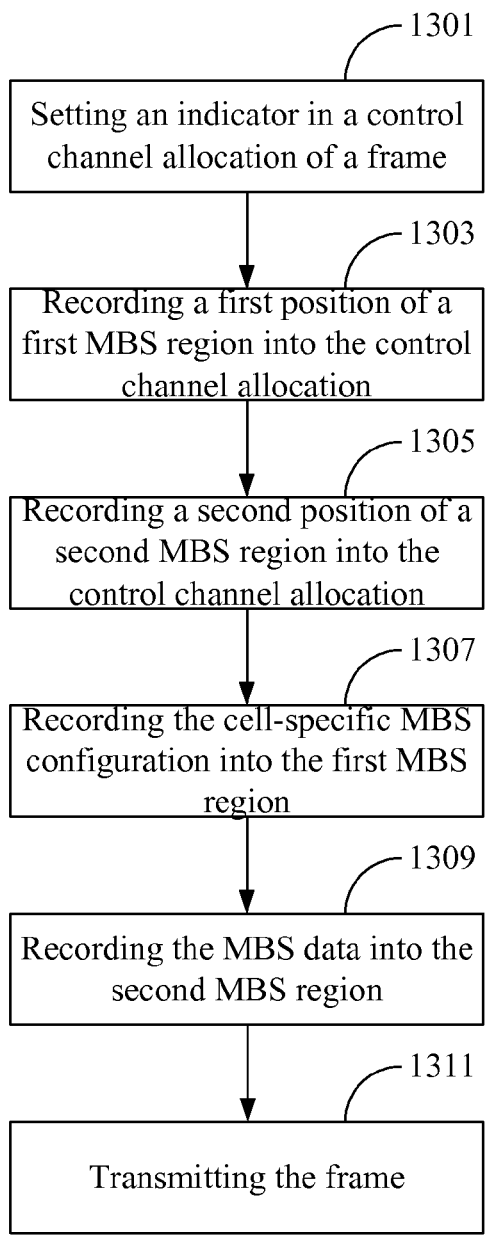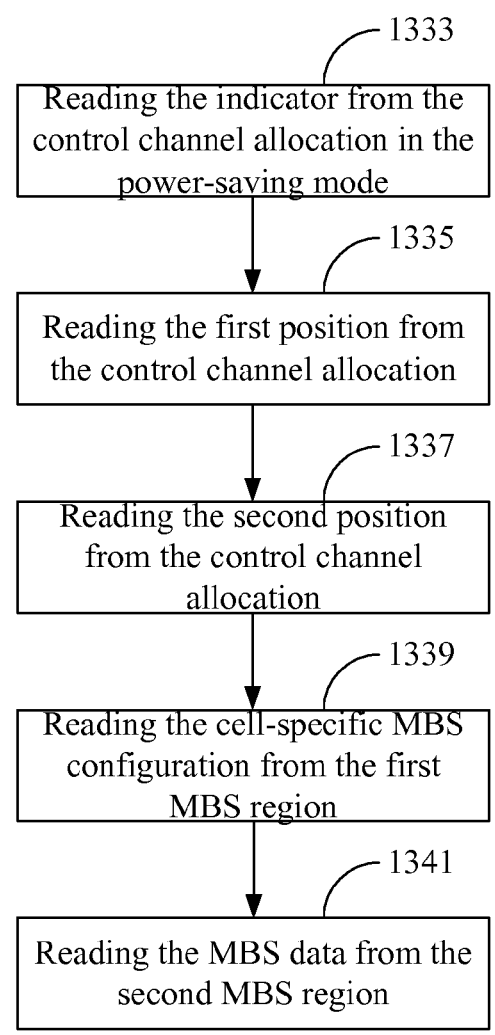
FIG. 13A
FIG. 13B

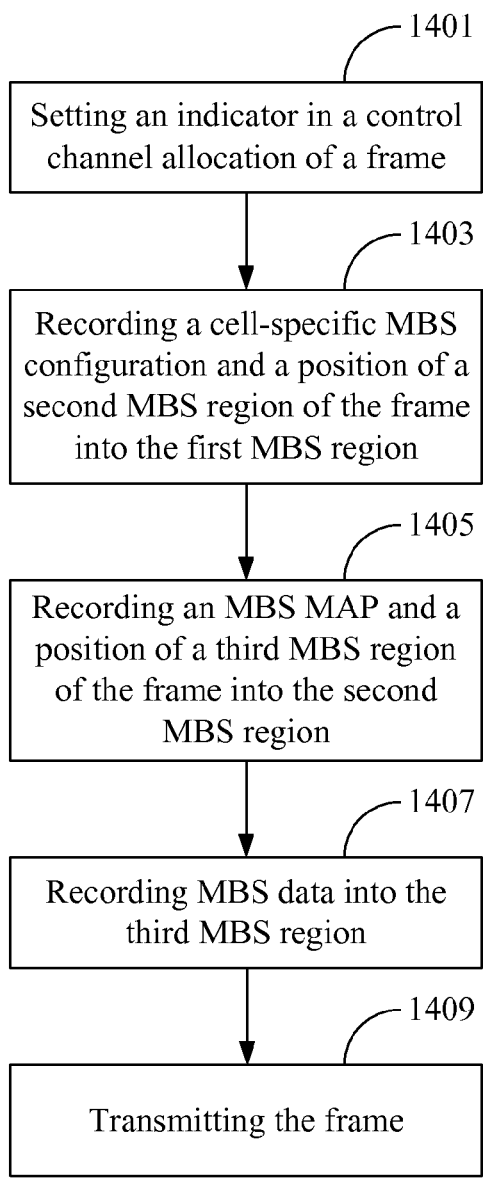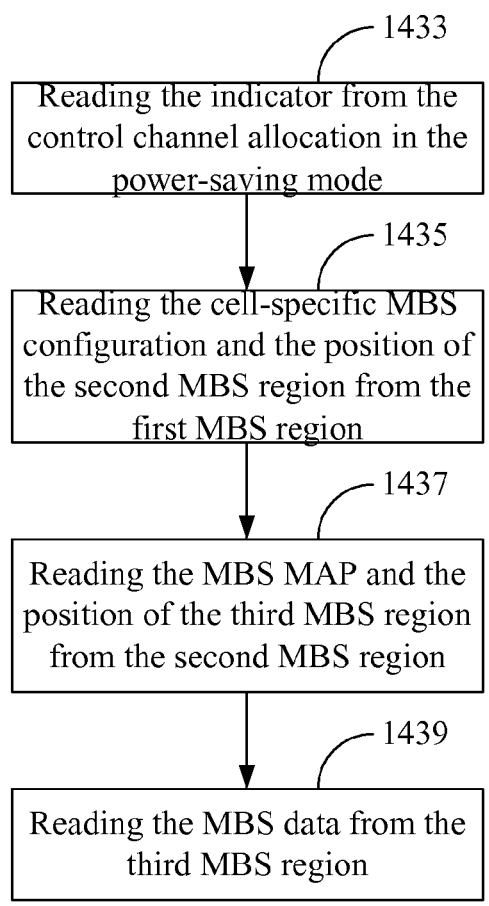
FIG. 14A
FIG. 14B

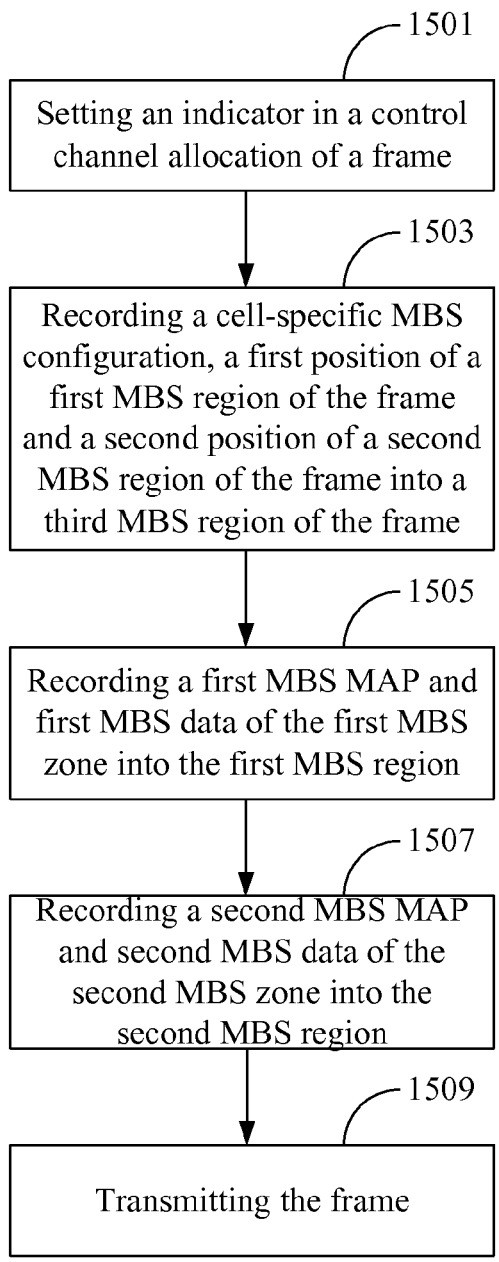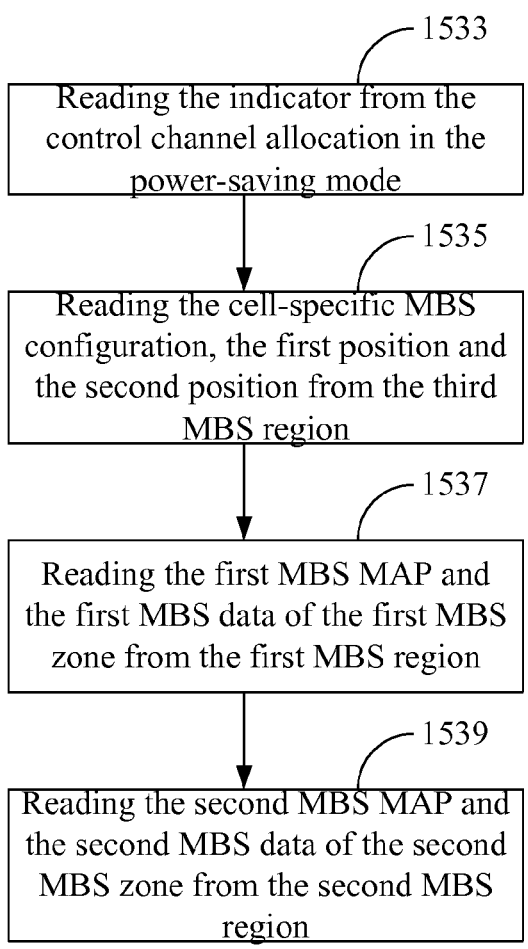
FIG. 15A
FIG. 15B

BASE STATION, MOBILE APPARATUS, AND COMMUNICATION METHOD THEREOF FOR MULTICAST AND BROADCAST SERVICE

PRIORITY

This application claims the priority benefit of U.S. Provisional Patent Application No. 61/171,477, filed on Apr. 22, 2009, U.S. Provisional Patent Application No. 61/256,315, filed on Oct. 30, 2009, and U.S. Provisional Patent Application No. 61/258,228, filed on Nov. 5, 2009, the disclosures of which are incorporated herein by reference in their entirety.

FIELD

The present invention relates to a base station (BS), a mobile apparatus and a communication method thereof; and more particularly, the present invention relates to a BS, a mobile apparatus and a communication method thereof for multicast and broadcast service (MBS).

BACKGROUND

In order to reduce the transmission cost, wireless network operators usually provide multimedia broadcast services of massive data in a form of multicast and broadcast service (MBS). MBS is classified into two categories, namely, the Single-BS MBS and the Multi-BS MBS. The Multi-BS MBS is advantageous in that, a plurality of BSs transmits data at the same frequency synchronously, so saving of bandwidth resources and the macro-diversity effect can be achieved, and data can be received by a mobile apparatus with enhanced reliability.

FIG. 1 depicts a schematic view of MBS zones 11, 12 involved in a wireless network system that provides MBS. The MBS zone 11 comprises at least one (e.g., seven) cell, which is represented by seven hexagons in the left portion of FIG. 1 and one of which is a cell 111. Each of the cells is served by a BS, which is represented by a dark dot inside a corresponding hexagon of FIG. 1; for example, the cell 111 is served by the BS 111a. The BS located within the MBS zone 11 belongs to the MBS zone 11 and provides MBS. Similarly, the MBS zone 12 comprises at least one (e.g., seven) cell, which is represented by seven hexagons in the right portion of FIG. 1 and one of which is a cell 121. Each of the cells is served by a BS, which is represented by a dark dot inside a corresponding hexagon of FIG. 1; for example, the cell 121 is served by the BS 121a. The BS located within the MBS zone 12 belongs to the MBS zone 12 and provides MBS. Furthermore, a mobile apparatus 111b is located within the cell 111. The mobile apparatus 111b operates in a power-saving mode and has to receive MBS data within the MBS zone 11.

Because each MBS zone has its own MBS configurations, the mobile apparatus must receive the MBS configurations at first before being able to receive the MBS data. MBS configurations are classified into non-cell-specific MBS configurations and cell-specific MBS configurations. A non-cell-specific MBS configuration is common data to a whole MBS zone, examples of which are an MBS MAP and an MBS data. In contrast, a cell-specific MBS configuration is related to a specific BS in the MBS zone, examples of which are an MBS zone boundary indicator, an MBS MAP resource index, an MBS region resource index (comprising a location and a size of an MBS region), an MBS modulation coding scheme (MCS), an MBS transmission interval and a neighbor MBS flows mapping list.

In the prior art, if the MBS provided in the wireless network system supports the macro-diversity, then a BS transmits a non-cell-specific MBS configuration in an MBS region of a frame, and transmits a cell-specific MBS configuration in other regions of the frame. If the mobile apparatus continuously stays in the power-saving mode, it would fail to receive the cell-specific MBS configuration and, consequently, fail to receive the MBS data successfully. For this reason, the mobile apparatus must switch into an active mode to continuously search for the frame in order to obtain the cell-specific MBS configuration. However, this makes it impossible to save power of the mobile apparatus, thereby causing unnecessary waste of the power resource.

Moreover, when moving from the cell 111 of the MBS zone 11 to the cell 121 of the MBS zone 12, the mobile apparatus 111b must perform an MBS location update procedure in order to continuously receive the MBS data. However, in the prior art, the mobile device 111b has no way to know the cell-specific MBS configuration related to the BS 121a in the MBS zone 12 in advance, so this will cause delay and/or interruption in the MBS data transmission.

Accordingly, there is an unmet need in the art to provide a solution that allows the mobile apparatus to derive the cell-specific MBS configuration in advance or in real time so as to avoid waste of the power resource and delay and/or interruption in the MBS data transmission.

SUMMARY

An objective of the present invention is to provide a communication method for multicast and broadcast service (MBS). The communication method is adapted for a BS, and the BS belongs to an MBS zone. The BS comprises a processor and a transceiver. The communication method comprises the following steps of: (a) enabling the processor to set an indicator in a control channel allocation of a frame, wherein the indicator is related to a cell-specific MBS configuration of the BS, the control channel allocation is an allocation that a mobile apparatus has to read when it is in a power-saving mode and has to receive MBS data, and the MBS data is related to the MBS zone; and (b) enabling the transceiver to transmit the frame so that, after receiving the frame, the mobile apparatus can derive the cell-specific MBS configuration according to the indicator.

Another objective of the present invention is to provide a communication method for MBS. The communication method is adapted for a mobile apparatus, and the mobile apparatus belongs to an MBS zone. The mobile apparatus is in a power-saving mode and has to receive MBS data related to the MBS zone. The mobile apparatus comprises a processor and a transceiver. The communication method comprises the following steps of: (a) enabling the transceiver to read an indicator from a control channel allocation of a frame, wherein the indicator is related to a cell-specific MBS configuration of the BS, and the frame is transmitted by a BS belonging to the MBS zone; and (b) enabling the processor to derive the cell-specific MBS configuration according to the indicator.

Yet a further objective of the present invention is to provide a BS for MBS. The BS belongs to an MBS zone, and comprises a processor and a transceiver. The processor is configured to set an indicator in a control channel allocation of a frame, wherein the indicator is related to a cell-specific MBS configuration of the BS, the control channel allocation is an allocation that a mobile apparatus has to read when it is in a power-saving mode and has to receive MBS data, and the MBS data is related to the MBS zone. The transceiver is configured to transmit the frame so that, after receiving the frame, the mobile apparatus can derive the cell-specific MBS configuration according to the indicator.

Yet another objective of the present invention is to provide a mobile apparatus for MBS. The mobile apparatus belongs to an MBS zone. The mobile apparatus is in a power-saving mode and has to receive MBS data related to the MBS zone. The mobile apparatus comprises a transceiver and a processor. The transceiver is configured to read an indicator from a control channel allocation of a frame, wherein the indicator is related to a cell-specific MBS configuration of the BS, and the frame is transmitted by a BS belonging to the MBS zone. The processor is configured to derive the cell-specific MBS configuration according to the indicator.

In a wireless network system that provides MBS, for a frame transmitted by a BS, a mobile apparatus that is in a power-saving mode and has to receive MBS data will still read a specific allocation of the frame. In the present invention, such a specific allocation is referred to as a control channel allocation. The present invention sets a specific-cell MBS configuration in the control channel allocation of the frame. Thus, because the mobile apparatus that is in the power-saving mode and has to receive the MBS data will read the control channel allocation, the mobile apparatus can derive the cell-specific MBS configuration by simply reading the control channel allocation without need to search the whole frame. Therefore, the present invention can avoid waste of the power resources and delay and/or interruption in MBS data transmission.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIGS. 13A and 13B depict a schematic flowchart of a thirteenth example embodiment of the present invention;

FIGS. 14A and 14B depict a schematic flowchart of a fourteenth example embodiment of the present invention; and FIGS. 15A and 15B depict a schematic flowchart of a fifteenth example embodiment of the present invention.

Figure 1:
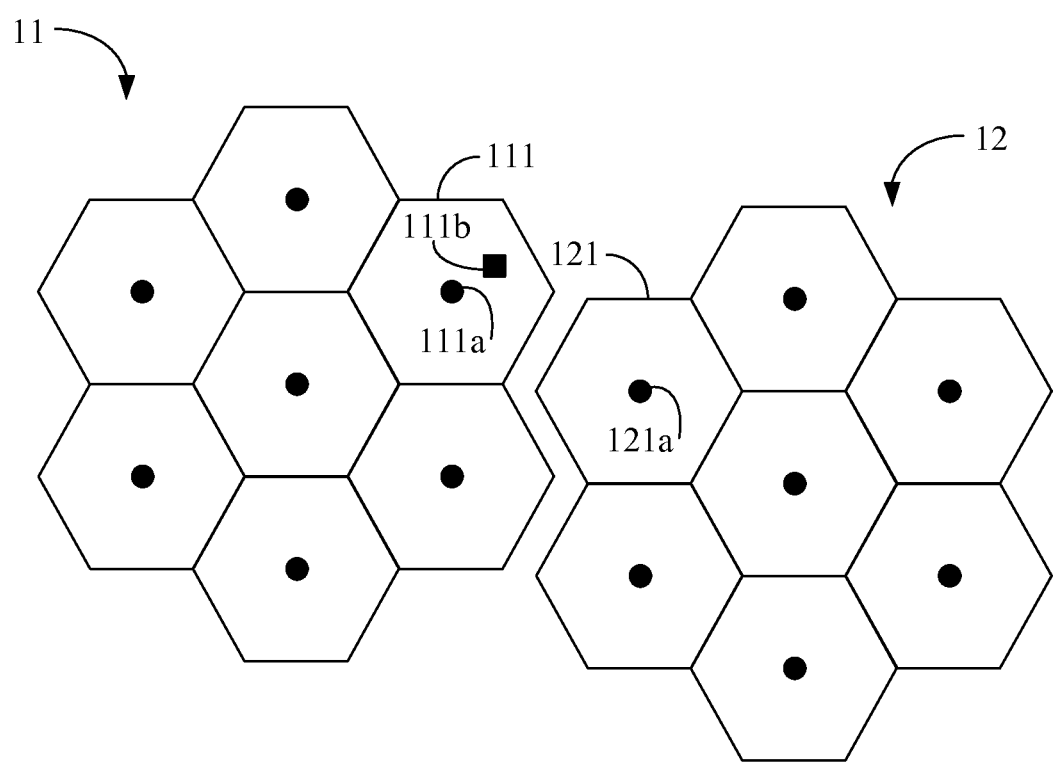
FIG. 1 depicts a schematic view of MBS zones.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, the present invention will be explained with reference to example embodiments thereof. However, these example embodiments are not intended to limit the present invention to any specific environment, applications or particular implementations described in these example embodiments. Therefore, description of these example embodiments is only for purpose of illustration rather than to limit the present invention. It shall be appreciated that, in the following example embodiments and the attached drawings, elements unrelated to the present invention are omitted from depiction; and dimensional relationships among individual elements in the attached drawings are illustrated only for ease of understanding, but not to limit the actual scale.

The BS, the mobile apparatus and the communication methods thereof provided in the present invention relate to multicast and broadcast service (MBS) in a wireless network system. The wireless network system according to certain example embodiments of the present invention may be a wireless network system conforming to the IEEE 802.16m standard, a wireless network system conforming to the LTE (Long Term Evolution) technology or some other wireless network system adopting a frame structure. It shall be noted that, as an emphasis of the present invention is how to handle the cell-specific MBS configuration in the MBS, the following example embodiments will just focus on this aspect. How the BS provides MBS and how the mobile apparatus makes registration to obtain the MBS are not emphases of the present invention.

Figure 2A:
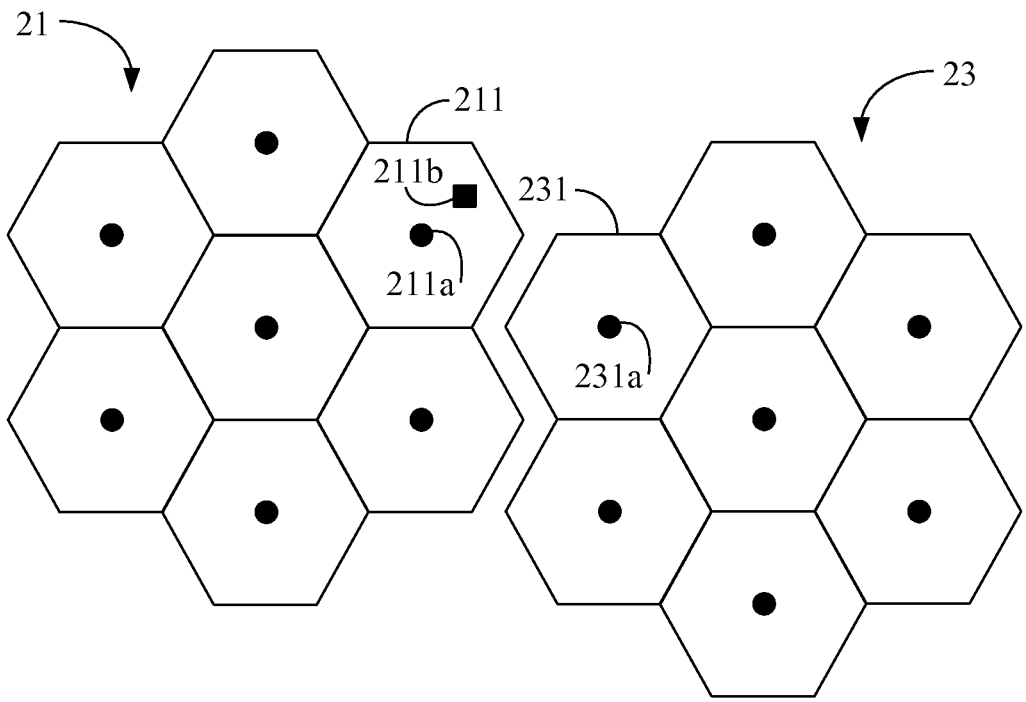
FIG. 2A depicts a schematic view of MBS zones of a wireless network system according to an example embodiment of the present invention.

FIG. 2A depicts a schematic view of MBS zones 21, 23 of a wireless network system involved in certain example embodiments of the present invention. The MBS zone 21 comprises at least one (e.g., seven) cell, which is represented by seven hexagons in the left portion of FIG. 2A and one of which is a cell 211. Each of the cells is served by a BS, which is represented by a dark dot inside a corresponding hexagon of FIG. 2A; for example, the cell 211 is served by a BS 211*a*. The BS located within the MBS zone 21 belongs to the MBS zone 21 and provides the MBS. Similarly, the MBS zone 23 comprises at least one (e.g., seven) cell, which is represented by seven hexagons in the right portion of FIG. 2A and one of which is a cell 231. Each of the cells is served by a BS, which is represented by a dark dot inside a corresponding hexagon of FIG. 2A; for example, the cell 231 is served by a BS 231*a*. The BS located within the MBS zone 23 belongs to the MBS zone 23 and provides the MBS. Furthermore, a mobile apparatus 211*b* is located within the cell 211. The mobile apparatus 211b operates in a power-saving mode and has to receive MBS data from within the MBS zone 21.

Figure 2B:
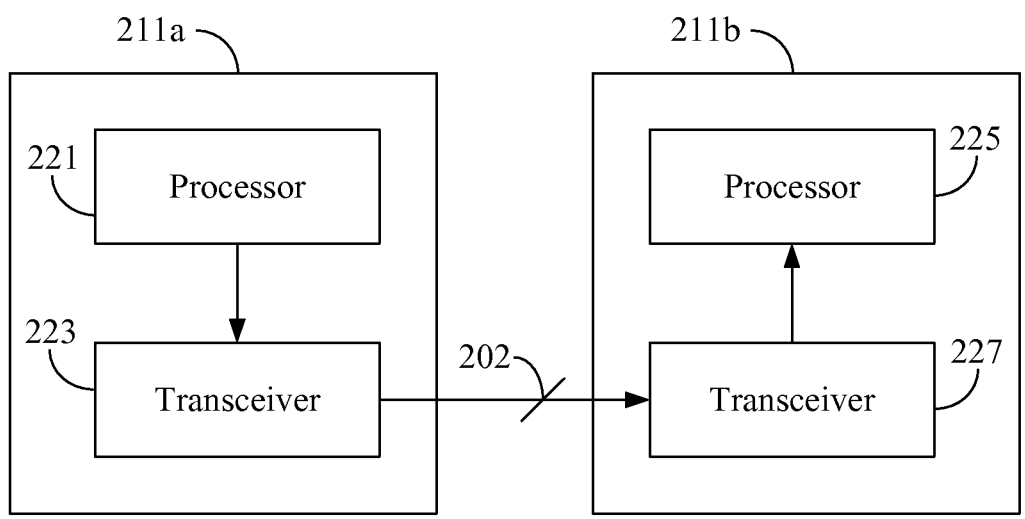
FIG. 2B depicts a schematic view of a BS and a mobile apparatus according to an example embodiment of the present invention.

Hereinafter, technical features of the present invention will be described with reference to the BS 211a and the mobile apparatus 211b located within the cell 211. Referring to FIG. 2B, a schematic view of the BS 211a and the mobile apparatus 211b is depicted therein. The BS 211a comprises a processor 221 and a transceiver 223; and the mobile apparatus 211b comprises a processor 225 and a transceiver 227. The processors 221, 225 may be various processors, central processing units (CPUs), microprocessors, calculators or other devices that will readily occur to those of ordinary skill in the art and have computing capabilities, either currently available or to be developed in the future. The transceivers 221, 223 may be various transceivers either currently available or to be developed in the future, e.g., antennas.

In the wireless network system that provides MBS, when the mobile apparatus is in the power-saving mode and has to receive MBS data, it will still read a specific allocation of a frame transmitted by the BS, for example, a synchronous channel, a special synchronous channel, a broadcast channel, a paging advertisement, a downlink MAP or an MBS MAP comprised in the frame. In the present invention, such a specific allocation is referred to as a control channel allocation.

A frame adopted in the wireless network system defines at least one control channel allocation. As described above, the at least one control channel allocation is an allocation(s) that the mobile apparatus 211b has to read when it is in the power-saving mode and has to receive MBS data of the MBS zone 21. The processor 221 of the BS 211a sets an indicator in a control channel allocation of a frame to be transmitted, with the indicator being related to a cell-specific MBS configuration of the BS 211a in this MBS zone 21. Then, the frame 202 thus processed is transmitted by the transceiver 223 of the BS 211a.

When the transceiver 227 of the mobile apparatus 211b that is in the power-saving mode and has to receive the MBS data as well as receives the control channel allocation in the frame 202 transmitted by the BS 211a, the transceiver 227 reads the indicator in the control channel allocation. Then, the processor 225 of the mobile apparatus 211b derives a cell-specific MBS configuration according to the indicator. Because the control channel allocation of the frame 202 is an allocation that the mobile apparatus 211b has to read when it is in the power-saving mode and has to receive the MBS data, the mobile apparatus 211b can derive the cell-specific MBS configuration without need to continuously search the whole frame 202.

Hereinbelow, various technical features of the present invention will be further described with reference to several different example embodiments. As frames involved in different example embodiments have different contents, the BS 211a and the mobile apparatus 211b will operate in different ways to derive the cell-specific MBS configuration in different example embodiments.

Figure 3:
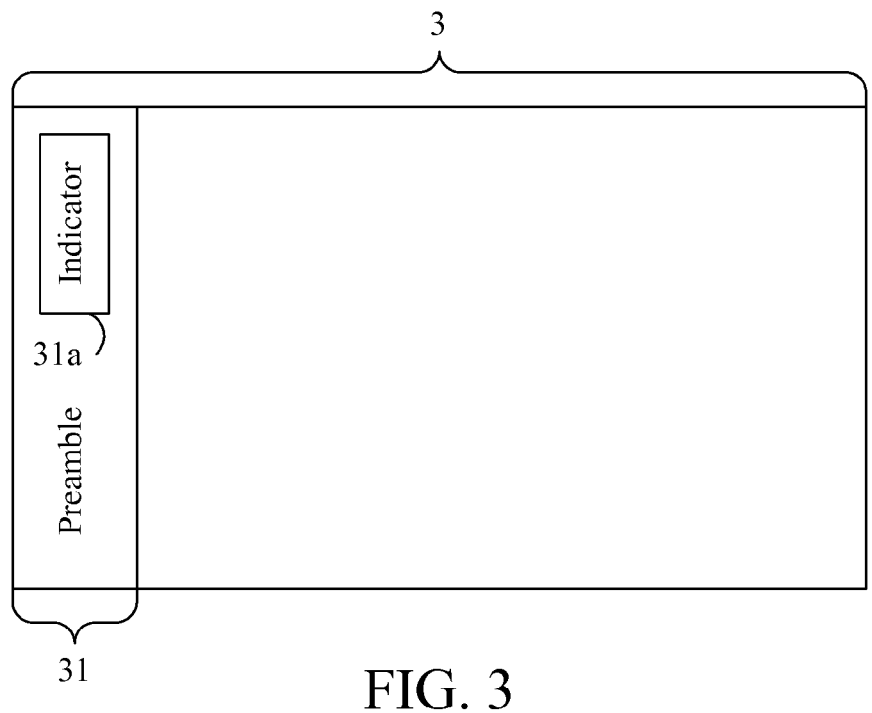
FIG. 3 depicts a schematic view of a frame adopted in a first example embodiment of the present invention.

FIG. 3 depicts a schematic view of a frame 3 adopted in a first example embodiment of the present invention. The frame 3 comprises a preamble 31 therein, and the preamble 31 is just the control channel allocation in the frame 3. In the wireless network system, the preamble 31 is viewed as a synchronous channel for purpose of synchronization.

The processor 221 of the BS 211a sets an indicator 31a in the preamble (i.e., the control channel allocation) 31. As an example, the processor 221 may set the preamble 31 as a pre-defined preamble, and the pre-defined preamble is just the indicator 31a. As another example, the processor 211 may also set a portion of the preamble 31 as the indicator 31a.

Furthermore, this example embodiment further sets contents of the indicator 31a as the cell-specific MBS configuration. For example, the cell-specific MBS configuration carried in the indicator 31a may be an MBS zone boundary indicator and/or an MBS continuity indicator. Briefly speaking, this example embodiment uses some cell-specific MBS configurations as the indicator 31a and further uses the indicator 31a as a portion or whole of the preamble 31. After being processed by the processor 221 of the BS 211a, the frame 3 is transmitted by the transceiver 223.

On the other hand, after the transceiver 227 of the mobile apparatus 211b that is in the power-saving mode and has to receive the MBS data receives the preamble (i.e., the control channel allocation) 31 of the frame, the transceiver 227 reads the indicator 31a in the preamble (i.e., the control channel allocation) 31. Then, the processor 225 of the mobile apparatus 211b derives the cell-specific MBS configuration from the indicator 31a in the preamble 31. Because, in this example embodiment, the indicator 31a is just the cell-specific MBS configuration, the processor 225 can derive the cell-specific MBS configuration immediately after reading the indicator 31a.

As can be seen from the above description, by use of the structure of the frame 3 of the first example embodiment, the mobile apparatus 211b that has to receive the MBS data can derive the cell-specific MBS configuration from the indicator 31a by reading the indicator 31a of the preamble 31 in the power-saving mode without need to search all the contents of the frame 3.

Figure 4:
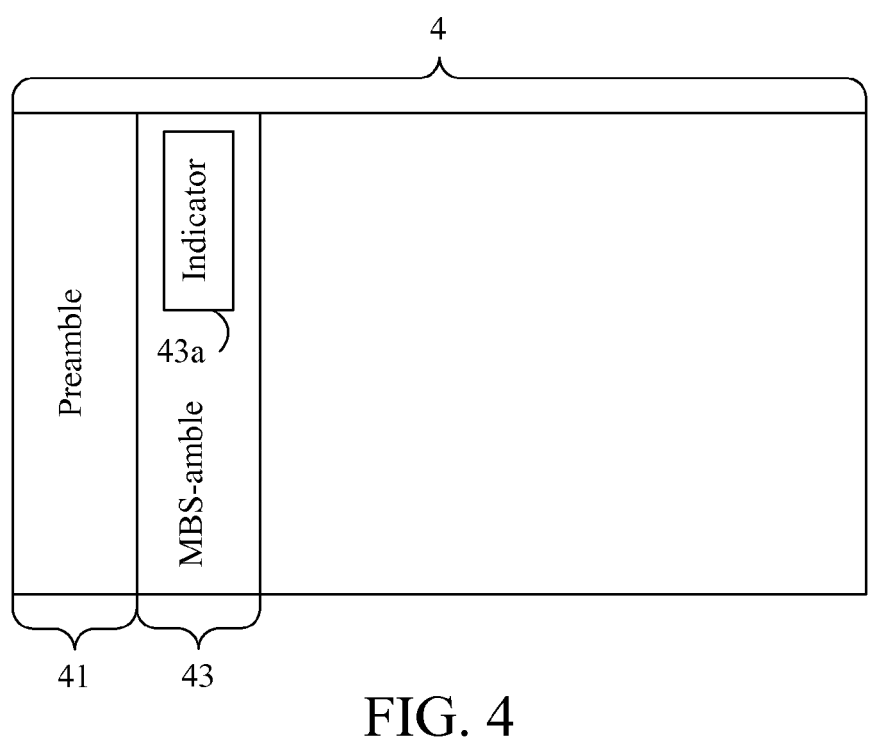
FIG. 4 depicts a schematic view of a frame adopted in a second example embodiment of the present invention.

FIG. 4 depicts a schematic view of a frame 4 adopted in the second example embodiment of the present invention. The frame 4 comprises a preamble 41 and an MBS-amble 43. In this example embodiment, the control channel allocation is the MBS-amble 43 in the frame 4. In the wireless network system, the MBS-amble 43 is viewed as a synchronous channel for purpose of MBS synchronization. The MBS-amble 43 is also an allocation that the mobile apparatus 211b has to read when it is in an idle mode and has to receive MBS data.

In this example embodiment, the processor 221 of the BS 211a sets an indicator 43a in the MBS-amble (i.e., the control channel allocation) 43, and contents of the indicator 43a are just the cell-specific MBS configuration. Similarly, the processor 221 may set the MBS-amble 43 as a pre-defined MBS-amble, and the pre-defined MBS-amble is just the indicator 43a; and the processor 221 may also set a part of the MBS-amble 43 as the indicator 43a.

On the other hand, the transceiver 227 of the mobile apparatus 211b that has to receive the MBS data and is in the power-saving mode reads the indicator 43a of the frame 4 to derive the cell-specific MBS configuration. As the second example embodiment differs from the first example embodiment mainly in terms of the control channel allocation, other identical portions will not be described again herein.

As can be seen from the above description, by use of the structure of the frame 4 of the second example embodiment, the mobile apparatus 211b can derive the cell-specific MBS configuration from the indicator 43a by reading the MBS-amble 43 without need to search all the contents of the frame 4.

Figure 5:
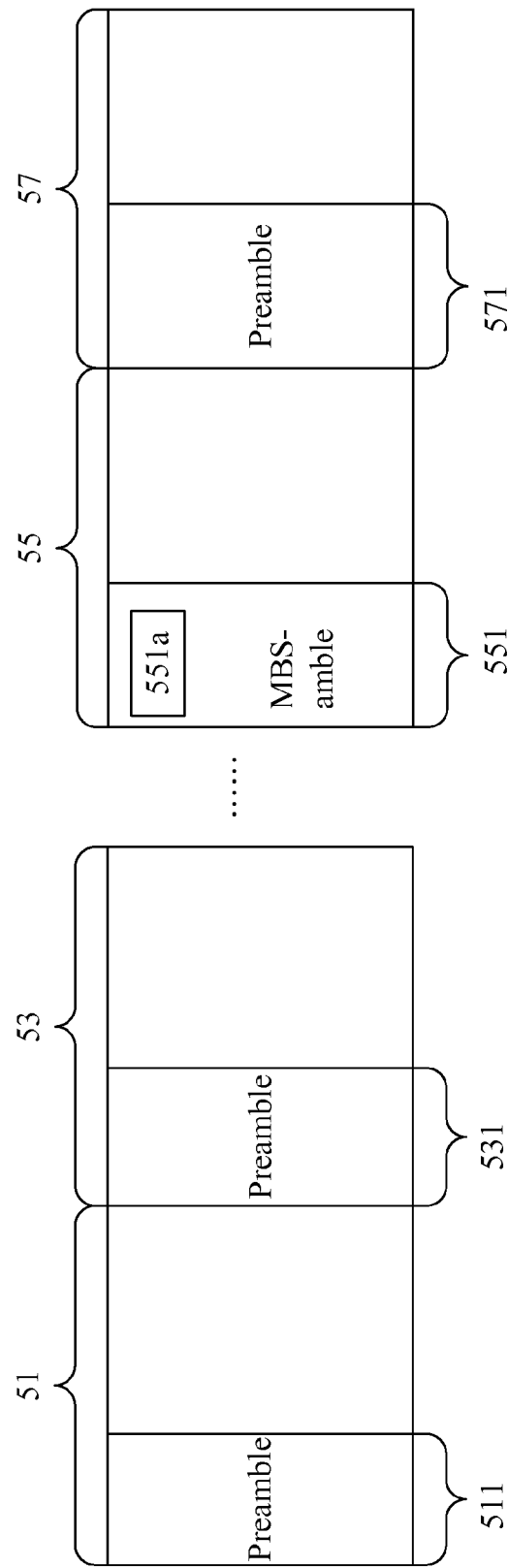
FIG. 5 depicts a schematic view of frames adopted in a third example embodiment of the present invention.

FIG. 5 depicts a schematic view of frames 51, 53, 55, 57 adopted in the third example embodiment of the present invention. The frames 51, 53, 57 comprise preambles 511, 531, 571 respectively therein, while the frame 55 comprises an MBS-amble 551 therein. In the third example embodiment, the MBS-amble carries therein a reference signal for purpose of synchronization, an identification (ID) of the BS, MBS zone information, signal strength and the like. Accordingly, when a frame already comprises an MBS-amble therein, there is no need to further comprise a preamble.

In this example embodiment, the control channel allocation is the MBS-amble of the frame, for example, the MBS-amble 551 of the frame 55. In this example embodiment, the processor 221 of the BS 211*a* also sets an indicator 551*a* in the MBS-amble (i.e., the control channel allocation) 551, and contents of the indicator 551*a* are just the cell-specific MBS configuration. Similarly, the mobile apparatus 211*b* can derive the cell-specific MBS configuration immediately after the transceiver 227 thereof reads the indicator 551*a* of the MBS-amble 551. In this example embodiment, operations of the BS 211*a* and the mobile apparatus 211*b* are just similar to those of the second example embodiment and, thus, will not be described again herein.

As can be seen from the above description, by use of the structure of the frame of the third example embodiment, the mobile apparatus 211*b* that has to receive the MBS data can derive the cell-specific MBS configuration from the indicator 551*a* by reading the MBS-amble 551 in the power-saving mode without need to search all the contents of the frame 55.

Figure 6:
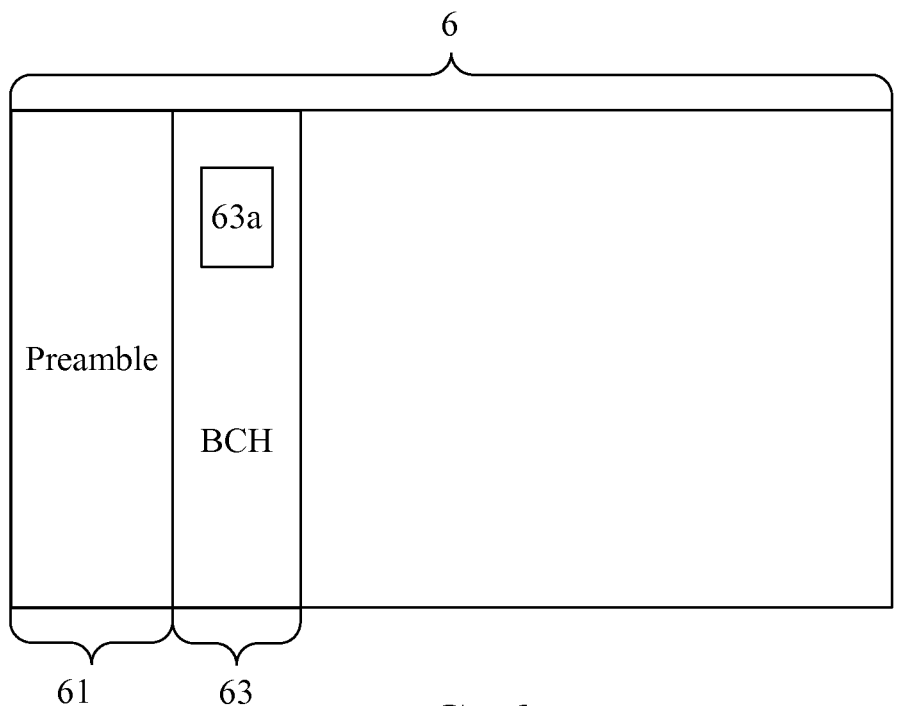
FIG. 6 depicts a schematic view of a frame adopted in a fourth example embodiment of the present invention.

FIG. 6 depicts a schematic view of a frame 6 adopted in a fourth example embodiment of the present invention. The frame 6 comprises a preamble 61 and a broadcast channel (BCH) 63 therein. In this example embodiment, the control channel allocation is the BCH 63 in the frame 6. In the wireless network system, the BCH carries parameters and settings of the wireless network system. The BCH 63 is also an allocation that the mobile apparatus 211*b* has to read when it is in the power-saving mode and has to receive the MBS data.

In this example embodiment, the processor 221 of the BS 211*a* sets an indicator 63*a* in the BCH (i.e., the control channel allocation) 63, and contents of the indicator 63*a* are just the cell-specific MBS configuration. Similarly, the transceiver 227 of the mobile apparatus 211*b* that is in the power-saving mode and has to receive MBS data can derive the cell-specific MBS configuration by reading the indicator 63*a* of the frame 6. As the fourth example embodiment differs from the first example embodiment mainly in terms of the control channel allocation, other identical portions will not be described again herein.

As can be seen from the above description, by use of the structure of the frame 6 of the fourth example embodiment, the mobile apparatus 211*b* can derive the cell-specific MBS configuration from the indicator 63*a* by reading the BCH 63 without need to search all the contents of the frame 6.

Figure 7:
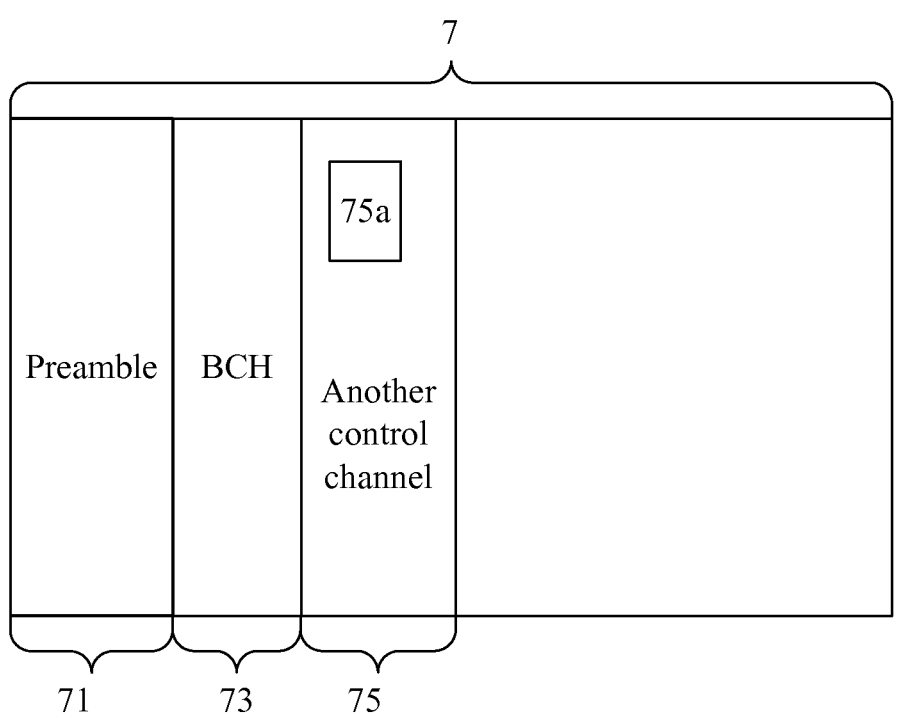
FIG. 7 depicts a schematic view of a frame adopted in a fifth example embodiment of the present invention.

FIG. 7 depicts a schematic view of a frame 7 adopted in the fifth example embodiment of the present invention. The frame 7 comprises a preamble 71, a BCH 73 and another control channel 75. In this example embodiment, the control channel allocation is the control channel 75 in the frame 7. The control channel 75 is also an allocation that the mobile apparatus 211*b* has to read when it is in the power-saving mode and has to receive MBS data.

In this example embodiment, the processor 221 of the BS 211*a* sets an indicator 75*a* in the control channel (i.e., the control channel allocation) 75, and contents of the indicator 75*a* are just the cell-specific MBS configuration. Similarly, the mobile apparatus 211*b* can derive the cell-specific MBS configuration immediately after the transceiver 227 thereof reads the indicator 75*a* of the frame 7. As the fifth example embodiment differs from the first example embodiment mainly in terms of the control channel allocation, other identical portions will not be described again herein.

As can be seen from the above description, by use of the structure of the frame 7 of the fifth example embodiment, the mobile apparatus 211*b* can derive the cell-specific MBS configuration from the indicator 75*a* by reading the another control channel 75 without need to search all the contents of the frame 7.

Figure 8:
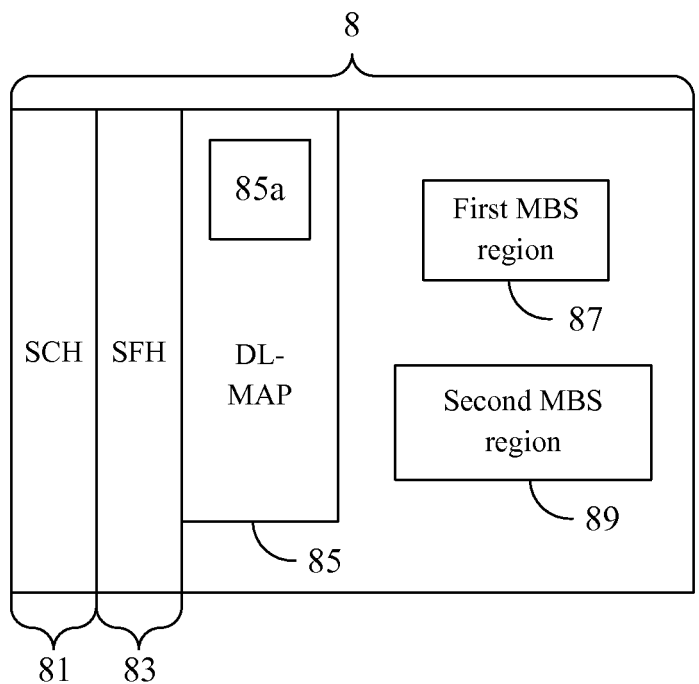
FIG. 8 depicts a schematic view of a frame adopted in a sixth example embodiment of the present invention.

FIG. 8 depicts a schematic view of a frame 8 adopted in the sixth example embodiment of the present invention. The frame 8 comprises a synchronization channel (SCH) 81, a superframe header (SFH) 83, a downlink MAP (DL-MAP) 85, a first MBS region 87 and a second MBS region 89. In this example embodiment, the control channel allocation is the DL-MAP 85 in the frame 8. Meanwhile, the DL-MAP 8 of this example embodiment also plays a role of MBS MAP, so in the wireless network system, the DL-MAP 85 is also an allocation that the mobile apparatus 211*b* has to read when it is in the power-saving mode and has to receive MBS data.

In this example embodiment, the processor 221 of the BS 211*a* sets an indicator 85*a* in the DL-MAP (i.e., the control channel allocation) 85. The indicator 85*a* indicates whether there is any cell-specific MBS configuration in the frame 8. For example, the indicator 85*a* may be a single bit, and a value of 1 of the bit represents that there is a cell-specific MBS configuration in the frame, and a value of 0 of the bit represents that there is no cell-specific MBS configuration in the frame.

Assume that the processor 221 of the BS 211*a* sets the indicator 85*a* to indicate that there is a cell-specific MBS configuration in the frame 8 and sets (e.g., records) the indicator 85*a* into the DL-MAP (i.e., the control channel allocation) 85. Further, the processor 221 records a first position of the first MBS region 87 into the DL-MAP (i.e., the control channel allocation) 85 and records cell-specific MBS configuration into the first MBS region 87. Additionally, the processor 221 records MBS data to be transmitted into the second MBS region 89 and records a second position of the second MBS region 89 into the DL-MAP (i.e., the control channel allocation) 85. After processing of the frame 8 is completed by the processor 221 of the BS 211*a*, the frame 8 is transmitted by the transceiver 223.

The transceiver 227 of the mobile apparatus 211*b* that is in the power-saving mode and has to receive MBS data reads the indicator 85*a* of the DL-MAP (i.e., the control channel allocation) 85, and then the processor 225 of the mobile apparatus 211*b* learns from the indicator 85*a* that there is a cell-specific MBS configuration in the frame 8. Next, the processor 225 reads the first position of the first MBS region 87 and the second position of the second MBS region 89 from the DL-MAP (i.e., the control channel allocation) 85. Thereafter, the processor 225 reads the cell-specific MBS configuration recorded in the first MBS region 87 from the first position, and reads the MBS data recorded in the second MBS region 89 from the second position.

It shall be noted that, the first MBS region 87 in the frame 8 may be set to have a fixed size or a variable size. When the first MBS region 87 has a fixed size, if the contents of the cell-specific MBS configuration exceed the size of the first MBS region 87, the processor 221 of the BS 211*a* records extension information into the first MBS region 87. The extension information is configured to indicate where the surplus part of the cell-specific MBS configuration is recorded. Then, after reading the contents of the first MBS region 87, the mobile apparatus will read the surplus part of the cell-specific MBS configuration according to the extension information.

A seventh example embodiment of the present invention also adopts the frame 8 depicted in FIG. 8. The seventh example embodiment differs from the sixth example embodiment in that, in the seventh example embodiment, contents of the indicator 85a set in the DL-MAP (i.e., the control channel allocation) 85 are the size of the first MBS region 87. Thus, the mobile apparatus 211b can learn the size of the first MBS region 87 directly after the transceiver 227 of the mobile apparatus 211b reads the indicator 85a.

An eighth example embodiment of the present invention also adopts the frame 8 depicted in FIG. 8. In this example embodiment, the indicator 85a recorded by the processor 221 of the BS 211a in the DL-MAP (i.e., the control channel allocation) is the first position of the first MBS region 87. Additionally, the processor 211 records the second position of the second MBS region 89 into the DL-MAP (i.e., the control channel allocation) 85. The processor 221 records the cell-specific MBS configuration into the first MBS region 87, and records MBS data to be transmitted into the second MBS region 89. After processing of the frame 8 is completed by the processor 221 of the BS 211a, the frame 8 is transmitted by the transceiver 223 thereof.

After the transceiver 227 of the mobile apparatus 211b that is in the power-saving mode and has to receive MBS data has read the indicator 85a of the DL-MAP (i.e., the control channel allocation) 85, the processor 225 of the mobile apparatus 211b learns the first position of the first MBS region 87 from the indicator 85a. Then, the processor 225 reads the second position of the second MBS region 89 from the DL-MAP (i.e., the control channel allocation) 85. Thereafter, the processor 225 reads the cell-specific MBS configuration recorded in the first MBS region 87 from the first position, and reads the MBS data recorded in the second MBS region 89 from the second position.

As can be seen from the above description, by use of the structure of the frame 8 of the sixth, the seventh and the eighth example embodiments, the mobile apparatus 211b can read the cell-specific MBS configuration from the first MBS region 87 according to the indicator 85a by reading the DL-MAP 85 without need to search all the contents of the frame 8.

Figure 9:
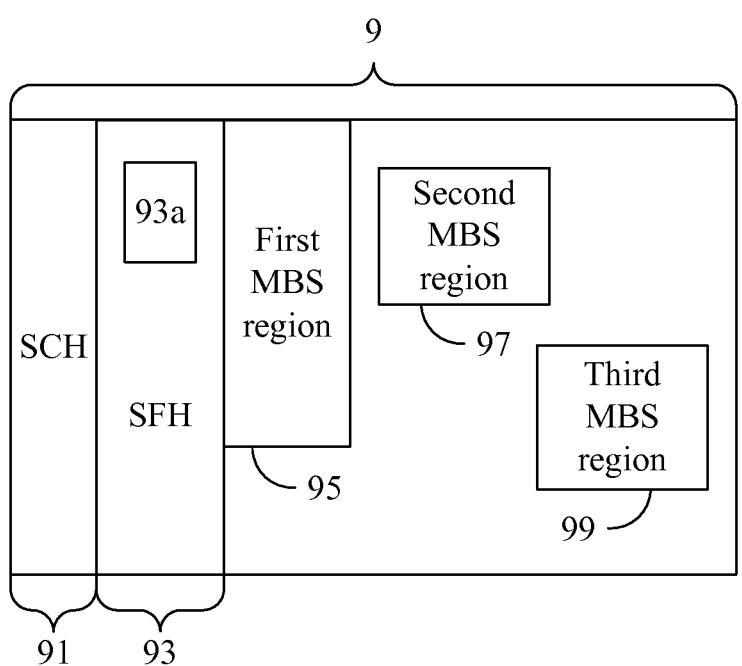
FIG. 9 depicts a schematic view of a frame adopted in a ninth example embodiment of the present invention.

FIG. 9 depicts a schematic view of a frame 9 adopted in a ninth example embodiment of the present invention. The frame 9 comprises an SCH 91, an SFH 93, a first MBS region 95, a second MBS region 97 and a third MBS region 99. In this example embodiment, the control channel allocation is the SFH 93 in the frame 9. In the wireless network system, the SFH 93 is also an allocation that the mobile apparatus 211b has to read when it is in the power-saving mode and has to receive MBS data.

In this example embodiment, the processor 221 of the BS 211a records an indicator 93a in the SFH (i.e., the control channel allocation) 93. The indicator 93a indicates whether there is any cell-specific MBS configuration in the frame 9. Assume that the processor 221 of the BS 211a sets the indicator 93a to indicate that there is a cell-specific MBS configuration in the frame 9, and sets (e.g., records) the indicator 93a into the SFH (i.e., the control channel allocation) 93.

In this example embodiment, the first MBS region 95 is immediately next to the SFH 93, and the processor 221 records the cell-specific MBS configuration and the position of the second MBS region 97 into the first MBS region 95. Furthermore, the processor 221 records the MBS MAP and a position of the third MBS region 99 into the second MBS region 97, and records MBS data to be transmitted into the third MBS region 99. After processing of the frame 9 is completed by the processor 221, the frame 9 is transmitted by the transceiver 223.

After the transceiver 227 of the mobile apparatus 211b that is in the power-saving mode and has to receive MBS data has read the indicator 93a of the SFH (i.e., the control channel allocation) 93, the processor 225 of the mobile apparatus 211b learns from the indicator 93a that there is a cell-specific MBS configuration in the frame 9. Because, in this example embodiment, the first MBS region 95 is immediately next to the SFH 93, the processor 225 directly reads the cell-specific MBS configuration and the position of the second MBS region 97 recorded in the first MBS region 95. Thereafter, the processor 225 reads the MBS MAP and the position of the third MBS region 99 recorded in the second MBS region 97 from the position of the second MBS region 97. Subsequently, the processor 225 reads the MBS data from the position of the third MBS region 99.

It shall be noted that, in other examples, the processor 221 of the BS 211a may record the position of the first MBS region 95 into the indictor 93a instead. In this case, the processor 225 of the mobile apparatus 211b has to read the position of the first MBS region 95 recorded in the indicator 93a at first before reading the cell-specific MBS configuration from the first MBS region 95.

As can be seen from the above description, by use of the structure of the frame 9 of the ninth example embodiment, the mobile apparatus 211b that has to receive the MBS data can read the cell-specific MBS configuration from the first MBS region 95 according to the indicator 93a by reading the indicator 93a of the SFH 93 without need to search all the contents of the frame 9.

Figure 10:
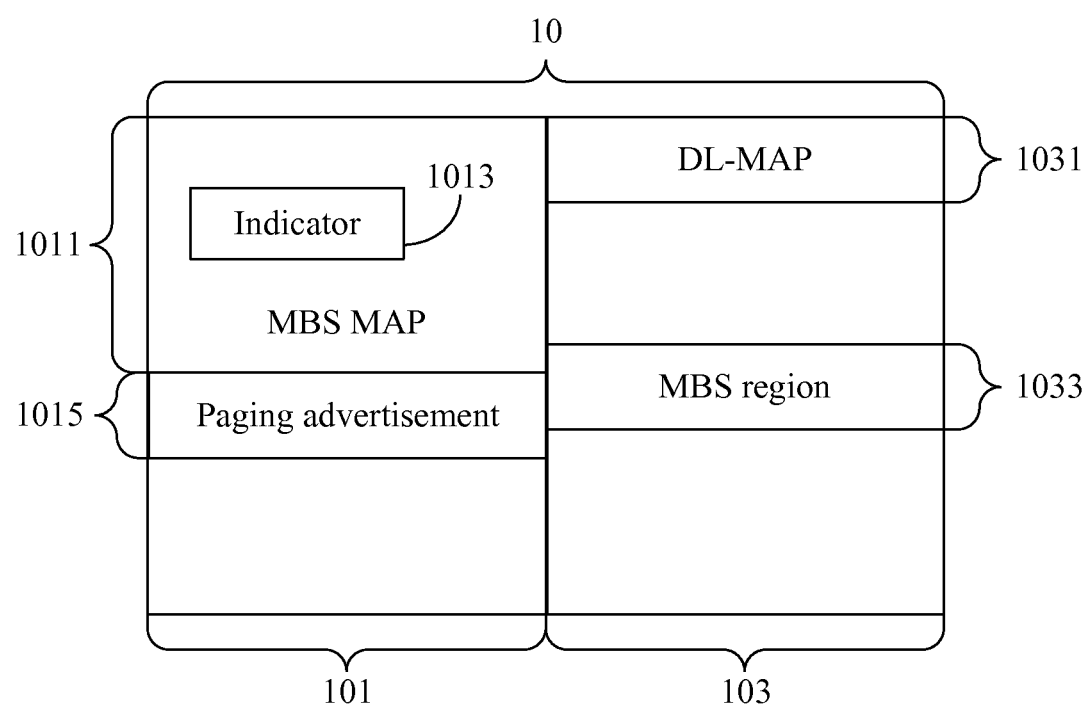
FIG. 10 depicts a schematic view of a frame 10 adopted in a tenth example embodiment of the present invention.

FIG. 10 depicts a schematic view of a frame 10 adopted in a tenth example embodiment of the present invention. The frame 10 comprises downlink (DL) subframes 101, 103. The DL subframe 101 is an MBS subframe, in which an MBS MAP 1011 and a paging advertisement 1015 are arranged. It is worth noting that, as the paging advertisement 1015 is also an allocation that is in the power-saving mode and has to receive MBS data, this example embodiment arranges the paging advertisement 1015 in the MBS region to shorten the time duration during which the BS 211a pages the mobile apparatus 211b. Furthermore, in the DL frame 103 are arranged a DL-MAP 1031 and an MBS region 1033. As the mobile apparatus 211b has to receive MBS data, it will read the MBS MAP 1011 even in the power-saving mode. In this example embodiment, the MBS MAP 1011 is just the control channel allocation in the frame 10.

In this example embodiment, the processor 221 of the BS 211a sets an indicator 1013 in the MBS MAP (i.e., the control channel allocation) 1011. The indicator 1013 indicates whether there is an MBS region 1033 in the next subframe (i.e., the subframe 103). If there is an MBS region 1033, then the processor 221 further records a position of the MBS region 1033 into the DL-MAP 1031. Furthermore, the processor 221 records the cell-specific MBS configuration into the MBS region 1033.

Because the mobile apparatus 211b has to receive MBS data and is in the power-saving mode, the transceiver 227 thereof reads the MBS MAP 1011. Once the indicator 1013 in the MBS MAP 1011 is read by the transceiver 227 of the mobile apparatus 211b, the mobile apparatus 211b can learn that there is an MBS region 1033 in the next subframe (i.e., the subframe 103). Then, the processor 225 of the mobile apparatus 211b reads the position of the MBS region 1033 from the DL-MAP 1031 and, further, reads the cell-specific MBS configuration from the position of the MBS region 1033.

As can be seen from the above description, by use of the structure of the frame 10 of the tenth example embodiment, the mobile apparatus 211b can read the cell-specific MBS configuration from the MBS region 1033 according to the indicator 1013 by reading the DL-MAP 1031 without need to search all the contents of the frame 10.

In the first to the tenth example embodiments, when the processor 225 of the mobile apparatus 211*b* determines that the mobile apparatus 211*b* moves into signal coverage of another BS of the second MBS zone, the processor 225 can update the MBS configuration according to contents of the cell-specific MBS configuration derived beforehand.

Figure 11A:
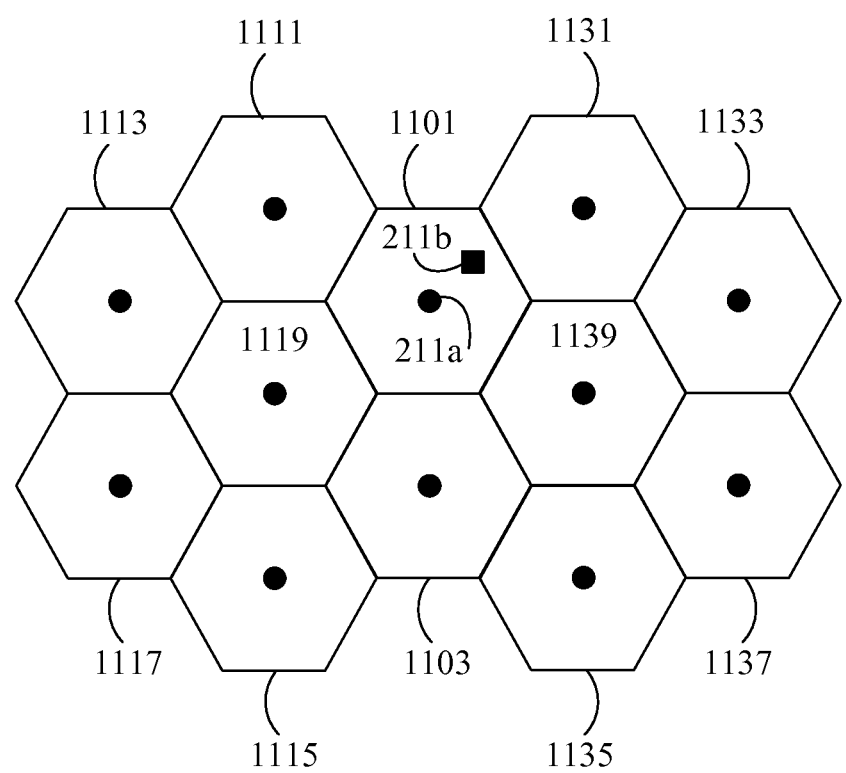
FIGS. 11A and 11B depicts a schematic view of another kind of MBS zones of a wireless network system according to certain example embodiments of the present invention.

FIG. 11A depicts a schematic view of another kind of MBS zones of a wireless network system involved in the present invention. FIG. 11A depicts twelve cells 1101, 1103, 1111, 1113, 1115, 1117, 1119, 1131, 1133, 1135, 1137, 1139. Each of the cells is served by a BS, which is represented by a dark dot inside a corresponding hexagon in FIG. 11A. In the aspect depicted in FIG. 11A, the first MBS zone comprises cells 1101, 1103, 1111, 1113, 1115, 1117, 1119, and the second MBS zone comprises cells 1101, 1103, 1131, 1133, 1135, 1137, 1139. In other words, the cells 1101, 1103 belong to both the first MBS zone and the second MBS zone.

In an eleventh example embodiment, operations that can be performed by the BS 211*a* and the mobile apparatus 211*b* in the cell 1101 will be described. The wireless network system to which the BS 211*a* and the mobile apparatus 211*b* belong defines an MBS transmission interval for a particular MBS zone. The concept of the MBS transmission interval is well known to those of ordinary skill in the art and, thus, will not be further described herein.

Figure 11B:
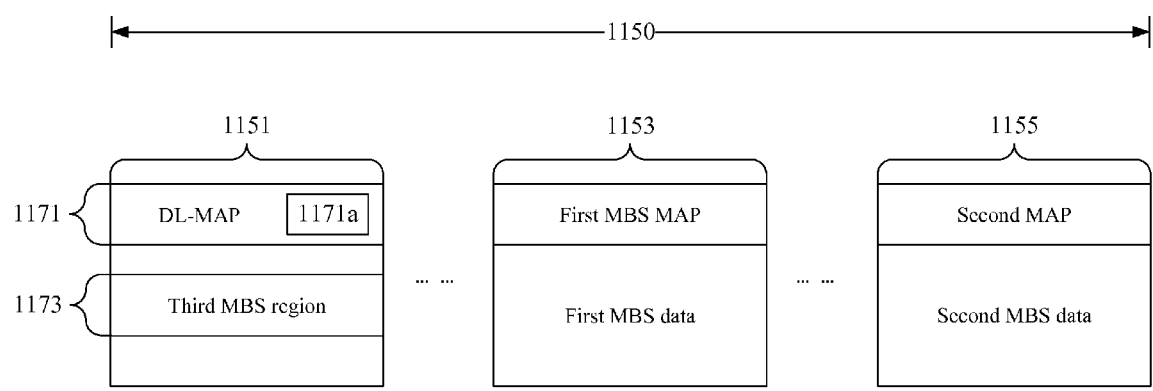

In this example embodiment, it is assumed that the maximum MBS transmission interval within the cell 1101 is eight, which means that a frame like the frame 1150 depicted in FIG. 11B will appear every eight (i.e., the maximum MBS transmission interval) frames. The frame 1150 comprises three subframes 1151, 1153, 1155. The subframe 1153 is arranged as the first MBS region and the subframe 1155 is arranged as the second MBS region. A DL-MAP 1171 and a third MBS region 1173 is arranged in the subframe 1151. In this example embodiment, the control channel allocation is the DL-MAP 1171 in the subframe 1151 of the frame 1150. In the wireless network system, the DL-MAP 1171 of the subframe 1151 in the frame 1150 that appears every maximum MBS transmission interval (e.g. when the maximum MBS transmission interval is eight, the frame that appears every eight frames) is an allocation that the mobile apparatus 211*b* has to read when it is in the power-saving mode and has to receive MBS data.

In this example embodiment, the processor 221 of the BS 211*a* sets an indicator 1171*a* in the DL-MAP (i.e., the control channel allocation) 1171. Contents of the indicator 1171*a* are a position of the third MBS region 1173. The processor 221 of the BS 211*a* records the cell-specific MBS configuration, the first position of the first MBS region (i.e., the subframe 1153) and the second position of the second MBS region (i.e., the subframe 1155) into the third MBS region 1173. Furthermore, the processor 221 records the first MBS MAP and the first MBS data of the first MBS zone into the first MBS region (i.e., the subframe 1153), and records the second MBS MAP and the second MBS data of the second MBS zone into the second MBS region (i.e., the subframe 1155). After processing of the frame 1150 is completed by the processor 221, the frame 1150 is transmitted by the transceiver 223.

The transceiver 227 of the mobile apparatus 211*b* that has to receive the first MBS data and the second MBS data reads the indicator 1171*a* in the DL-MAP (i.e., the control channel block) 1171 of the subframe 1151 so that the processor 225 of the mobile apparatus 211*b* learns the position of the third MBS region 1173 therefrom. Next, the processor 225 reads the cell-specific MBS configuration, the first position of the first MBS region (i.e., the subframe 1153) and the second position of the second MBS region (i.e., the subframe 1155) in the third MBS region 1173 from the position of the third MBS region 1173. Then, the processor 225 can read the first MBS MAP and the first MBS data of the first MBS region from the first position and reads the second MBS MAP and the second MBS data from the second MBS region from the second position.

As can be seen from the above description, by use of the frame structure of the eleventh example embodiment, the mobile apparatus 211*b* that has to receive the first MBS data and the second data can read the cell-specific MBS configuration from the third MBS region 1173 according to the indicator 1171*a* by reading the indicator 1171*a* of the DL MAP 1171 in the power-saving mode without need to search all the contents of the frame.

Figure 12A:
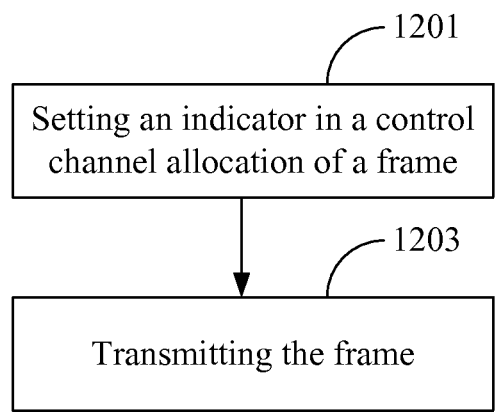
FIGS. 12A and 12B depict a schematic flowchart of a twelfth example embodiment of the present invention.

A twelfth example embodiment of the present invention is a communication method for MBS. FIG. 12A depicts a partial flowchart of this example embodiment, which is adapted for a BS, e.g., the BS 211*a* described above. The BS belongs to an MBS zone, and comprises a processor and a transceiver.

In the communication method, step 1201 is firstly executed to enable the processor of the BS to set an indicator in a control channel allocation of a frame. The control channel allocation is an allocation that the mobile apparatus has to read when it is in the power-saving mode and has to receive MBS data. For example, the control channel allocation may be a synchronous channel, a special synchronous channel, a broadcast channel, a paging advertisement, a DL-MAP or an MBS MAP arranged in the frame. Furthermore, the indicator is related to a cell-specific MBS configuration of the BS, and the MBS data is related to the MBS zone. Then, step 1203 is executed to enable the transceiver of the BS to transmit the frame that has been processed in the step 1201.

Figure 12B:
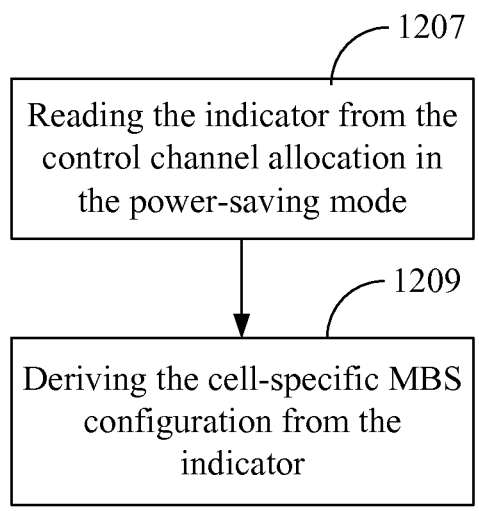

FIG. 12B depicts another schematic partial flowchart of this example embodiment, which is adapted for a mobile apparatus, e.g., the mobile apparatus 211*b* described above. The mobile apparatus also belongs to the aforesaid MBS zone, and comprises a processor and a transceiver. It shall be noted that, the mobile apparatus is in the power-saving mode and has to receive the MBS data related to the MBS zone.

Firstly, step 1207 is executed to enable the transceiver of the mobile apparatus that is in the power-saving mode and has to read the MBS data to read the indicator from the control channel allocation. Finally, step 1209 is executed to enable the processor to derive the cell-specific MBS configuration from the indicator.

It shall be noted that, when executing the step 1201, the BS may set contents of the indicator as the cell-specific MBS configuration. For example, the contents of the cell-specific MBS configuration may now be an MBS zone boundary indicator and/or an MBS continuity indicator. In this case, after the mobile apparatus reads the indicator in the step 1207, the step 1209 is executed to view the contents of the indicators as the cell-specific MBS configuration.

In addition to the aforesaid steps, the twelfth example embodiment can also execute all the operations and functions set forth in the first to the fifth and the tenth example embodiments. How the twelfth example embodiment executes these operations and functions will be readily appreciated by those of ordinary skill in the art based on the explanation of the first to the fifth and the tenth example embodiments, and thus will not be further described herein.

FIG. 13A depicts a schematic partial flowchart of a thirteenth example embodiment of the present invention, which is adapted for a BS, e.g., the BS 211*a* described above. The BS belongs to an MBS zone, and comprises a processor and a transceiver.

In this communication method, step 1301 is firstly executed to enable the processor of the BS to set an indicator in a control channel allocation of a frame. The indicator indicates that there is a cell-specific MBS configuration in the frame. Then, step 1303 is executed to enable the processor of the BS to record a first position of a first MBS region of the frame into the control channel allocation. Then, step 1305 is executed to enable the processor of the BS to record a second position of a second MBS region of the frame into the control channel allocation. Afterwards, step 1307 is executed to enable the processor to record the cell-specific MBS configuration into the first MBS region of the frame. Further, step 1309 is executed to enable the processor to record the MBS data into the second MBS region. Finally, step 1311 is executed to enable the transceiver of the BS to transmit the processed frame.

FIG. 13B depicts another schematic partial flowchart of the thirteenth example embodiment, which is adapted for a mobile apparatus, e.g., the mobile apparatus 211b described above. The mobile apparatus also belongs to the aforesaid MBS zone, and comprises a processor and a transceiver. It shall be noted that, the mobile apparatus is in the power-saving mode and has to receive the MBS data related to the MBS zone.

Firstly, step 1333 is executed to enable the transceiver of the mobile apparatus that is in the power-saving mode and has to receive the MBS data to read the indicator from the control channel allocation. As the indicator indicates that there is a cell-specific MBS configuration in the frame, steps 1335 and 1337 are then executed by the mobile apparatus to enable the processor thereof to read the first position of the first MBS region and the second position of the second MBS region respectively. Next, step 1339 is executed to enable the processor of the mobile apparatus to read the cell-specific MBS configuration recorded in the first MBS region from the first position, and step 1341 is executed to enable the processor of the mobile apparatus to read the MBS data recorded in the second MBS region from the second position.

It shall be noted that, when executing the aforesaid step 1301, the BS may set the contents of the indicator as a size of the first MBS region; thus, when the mobile apparatus executes the step 1333, the mobile apparatus can also learn that there is a cell-specific MBS configuration in the frame and, accordingly, execute the subsequent steps. In another case, when executing the aforesaid step 1301, the BS may set the contents of the indicator as the first position of the first MBS region and omit the step 1303; thus, the mobile apparatus can learn the first position early when executing the step 1333 and, therefore, the subsequent steps 1337, 1339 and 1341 can be executed straightforwardly without executing the step 1335.

In addition to the aforesaid steps, the thirteenth example embodiment can also execute all the operations and functions set forth in the sixth to the eighth example embodiments. How the thirteenth example embodiment executes these operations and functions will be readily appreciated by those of ordinary skill in the art based on the explanation of the sixth to the eighth example embodiments, and thus will not be further described herein.

FIG. 14A depicts a schematic partial flowchart of a fourteenth example embodiment of the present invention, which is adapted for a BS, e.g., the BS 211a described above. The BS belongs to an MBS zone, and comprises a processor and a transceiver.

In this communication method, step 1401 is firstly executed to enable the processor of the BS to set an indicator in a control channel allocation of a frame. Contents of the indicator are a position of a first MBS region in the frame. Then, step 1403 is executed to enable the processor of the BS to record a cell-specific MBS configuration and a position of a second MBS region of the frame into the first MBS region. Then, step 1405 is executed to enable the processor of the BS to record an MBS MAP and a position of a third MBS region of the frame into the second MBS region. Afterwards, step 1407 is executed to enable the processor of the BS to record MBS data into the third MBS region. Finally, step 1409 is executed to enable the transceiver of the BS to transmit the processed frame.

FIG. 14B depicts another schematic partial flowchart of the fourteenth example embodiment, which is adapted for a mobile apparatus, e.g., the mobile apparatus 211b described above. The mobile apparatus also belongs to the aforesaid MBS zone, and comprises a processor and a transceiver. It shall be noted that, the mobile apparatus is in the power-saving mode and has to receive the MBS data related to the MBS zone.

Firstly, step 1433 is executed to enable the transceiver of the mobile apparatus that is in the power-saving mode and has to receive the MBS data to read the indicator from the control channel allocation. As the indicator is the position of the first MBS region, step 1435 is then executed by the mobile apparatus to read the cell-specific MBS configuration and the position of the second MBS region recorded in the first MBS region from the position of the first MBS region. Next, step 1437 is executed by the mobile apparatus to enable the processor thereof to read the MBS MAP and the position of the third MBS region recorded in the second MBS region from the position of the second MBS region. Finally, step 1439 is executed to enable the processor of the mobile apparatus to read the MBS data recorded in the third MBS region from the position of the third MBS region.

In addition to the aforesaid steps, the fourteenth example embodiment can also execute all the operations and functions set forth in the ninth example embodiment. How the fourteenth example embodiment executes these operations and functions will be readily appreciated by those of ordinary skill in the art based on the explanation of the ninth example embodiment and, thus, will not be further described herein.

FIG. 15A depicts a schematic partial flowchart of a fifteenth example embodiment of the present invention, which is adapted for a BS, e.g., the BS 211a described above. The BS belongs to a first MBS zone and a second MBS zone, and comprises a processor and a transceiver.

In this communication method, step 1501 is firstly executed to enable the processor of the BS to set an indicator in a control channel allocation of a frame. The indicator is a third position of a third MBS region in the frame. Then, step 1503 is executed to enable the processor of the BS to record a cell-specific MBS configuration, a first position of a first MBS region of the frame and a second position of a second MBS region of the frame into a third MBS region of the frame. Then, step 1505 is executed to enable the processor of the BS to record a first MBS MAP and first MBS data of the first MBS zone into the first MBS region. Afterwards, step 1507 is executed by the BS to enable the processor thereof to record a second MBS MAP and second MBS data of the second MBS zone into the second MBS region. Finally, step 1509 is executed to enable the transceiver of the BS to transmit the processed frame.

FIG. 15B depicts another schematic partial flowchart of the fifteenth example embodiment, which is adapted for a mobile apparatus, e.g., the mobile apparatus 211b described above. The mobile apparatus also belongs to the first MBS zone and the second MBS zone described above, and comprises a processor and a transceiver. It shall be noted that, the mobile apparatus is in the power-saving mode and has to receive the MBS data related to the MBS zones.

Firstly, step 1533 is executed to enable the transceiver of the mobile apparatus that is in the power-saving mode and has to receive the MBS data to read the indicator from the control channel allocation. As contents of the indicator are the third position of the third MBS region, step 1535 is then executed by the mobile apparatus to enable the processor thereof to read the cell-specific MBS configuration, the first position and the second position recorded in the third MBS region from the third position. Next, step 1537 is executed by the mobile apparatus to read the first MBS MAP and the first MBS data of the first MBS zone in the first MBS region from the first position, and then step 1539 is executed to read the second MBS MAP and the second MBS data of the second MBS zone in the second MBS region from the second position.

In addition to the aforesaid steps, the fifteenth example embodiment can also execute all the operations and functions set forth in the eleventh example embodiment. How the fifteenth example embodiment executes these operations and functions will be readily appreciated by those of ordinary skill in the art based on the explanation of the eleventh example embodiment, and thus will not be further described herein.

Additionally, in the twelfth, the thirteenth, the fourteenth and the fifteenth example embodiments described above, when the processor of the mobile apparatus determines that the mobile apparatus moves into signal coverage of another BS of a second MBS zone, the processor can update the MBS configuration of the mobile apparatus according to contents of the cell-specific MBS configuration derived beforehand.

The communication method described in each of the twelfth, the thirteenth, the fourteenth and the fifteenth example embodiments may be implemented by a computer program respectively. When the computer program is loaded into the BS and the mobile apparatus, a plurality of codes of the computer program will be executed to accomplish the communication method described in each of the twelfth, the thirteenth, the fourteenth and the fifteenth example embodiments respectively. This application program may be stored in a tangible machine-readable medium, such as a read only memory (ROM), a flash memory, a floppy disk, a hard disk, a compact disk, an optical disk (CD), a mobile disk, a magnetic tape, a database accessible to networks, or any other storage media with the same function and well known to those skilled in the art.

Additionally, as used in the present invention, the words "first" and "second" in the terms "first MBS zone" and "second MBS zone" are only intended to express that the first MBS zone and the second MBS zone are different from each other; the words "first" and "second" in the terms "first MBS MAP" and "second MBS MAP" are only intended to express the first MBS MAP and the second MBS MAP are different from each other; the words "first", "second" and "third" in the terms "first MBS region", "second MBS region" and "third MBS region" are only intended to express that the first MBS region, the second MBS region and the third MBS region are different from each other.

In a wireless network system that provides MBS, for a frame transmitted by a BS, a mobile apparatus that is in the power-saving mode and has to receive MBS data will still read a specific allocation of the frame. In the present invention, such a specific allocation is referred to as a control channel allocation. The present invention records a specific-cell MBS configuration into the control channel allocation of the frame. Thus, because the mobile apparatus that is in the power-saving mode and has to receive the MBS data will read the control channel allocation, the mobile apparatus can derive the cell-specific MBS configuration by simply reading the control channel allocation without need to search the whole frame. Therefore, the present invention can avoid waste of the power resources and delay and/or interruption in MBS data transmission.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication method for multicast and broadcast service (MBS), the communication method being adapted for a base station (BS), the BS belonging to a first MBS zone, the BS comprising a processor and a transceiver, the communication method comprising the steps of:
   enabling the processor to set an indicator in a control channel allocation of a frame, the indicator being related to a cell-specific MBS configuration of the BS, wherein a content of the indicator comprises one of the following information: the cell-specific MBS configuration, the frame having the cell-specific MBS configuration, a size of a first MBS region of the frame, a first position of the first MBS region, and a next subframe having an MBS region, the control channel allocation being an allocation that a mobile apparatus has to read when it is in a power-saving mode and has to receive first MBS data, and the first MBS data being related to the first MBS zone; and
   enabling the transceiver to transmit the frame so that the mobile apparatus can derive the cell-specific MBS configuration according to the indicator in the control channel allocation without need to search the whole frame after receiving the frame.

2. The communication method as claimed in claim 1, wherein the control channel allocation is selected from a member of the group consisting of: a synchronous channel, a special synchronous channel, a broadcast channel, a paging advertisement, a downlink MAP, and an MBS MAP allocated in the frame.

3. The communication method as claimed in claim 1, wherein the cell-specific MBS configuration is one of an MBS zone boundary indicator, an MBS continuity indicator, and a combination thereof.

4. The communication method as claimed in claim 1, further comprising the steps of:
   enabling the processor to record the cell-specific MBS configuration into the first MBS region of the frame;
   enabling the processor to record the first position of the first MBS region into the control channel allocation;
   enabling the processor to record the first MBS data into a second MBS region of the frame; and
   enabling the processor to record a second position of the second MBS region into the control channel allocation,
   wherein the indicator indicates that the frame having the cell-specific MBS configuration so that the mobile apparatus is able to read the first position, read the cell-specific MBS configuration from the first position according to the first position, read the second position, and read the first MBS data from the second position according to the second position after reading the indicator after the mobile apparatus reads the indicator.

5. The communication method as claimed in claim 1, further comprising the steps of:
enabling the processor to record the cell-specific MBS configuration into the first MBS region of the frame;
enabling the processor to record the first position of the first MBS region into the control channel allocation;
enabling the processor to record the first MBS data into a second MBS region of the frame; and
enabling the processor to record a second position of the second MBS region into the control channel allocation,
wherein the indicator indicates the size of the first MBS region so that the mobile apparatus is able to read the first position, read the cell-specific MBS configuration according to the first position and the size of the first MBS region, reads the second position, and read the first MBS data from the second position after the mobile apparatus reads the indicator.

6. The communication method as claimed in claim 1, further comprising the steps of:
enabling the processor to record the cell-specific MBS configuration into the first MBS region of the frame;
enabling the processor to record the first MBS data into a second MBS region of the frame; and
enabling the processor to record a second position of the second MBS region into the control channel allocation,
wherein the indicator is the first position of the first MBS region so that the mobile apparatus is able to read the cell-specific MBS configuration from the first position, read the second position, and read the first MBS data from the second position after the mobile apparatus reads the indicator.

7. The communication method as claimed in claim 1, further comprising the steps of:
enabling the processor to record the cell-specific MBS configuration and a position of a second MBS region of the frame into the first MBS region of the frame;
enabling the processor to record an MBS MAP and a position of a third MBS region of the frame into the second MBS region; and
enabling the processor to record the first MBS data into the third MBS region,
wherein the mobile apparatus reads the MBS MAP according to the position of the second MBS region and reads the first MBS data according to the position of the third MBS region after the mobile apparatus derives the cell-specific MBS configuration according to the indicator.

8. The communication method as claimed in claim 1, wherein the BS further belongs to a second MBS zone, and the communication method further comprises the steps of:
enabling the processor to record a first MBS MAP and the first MBS data of the first MBS zone into the first MBS region of the frame;
enabling the processor to record a second MBS MAP and second MBS data of the second MBS zone into a second MBS region of the frame; and
enabling the processor to record the cell-specific MBS configuration, the first position of the first MBS region and a second position of the second MBS region into a third MBS region of the frame,
wherein the mobile apparatus reads the first MBS MAP and the first MBS data according to the first position and reads the second MBS MAP and the second MBS data according to the second position after the mobile apparatus derives the cell-specific MBS configuration according to the indicator.

9. A communication method for MBS, the communication method being adapted for a mobile apparatus, the mobile apparatus belonging to a first MBS zone, the mobile apparatus being in a power-saving mode and having to receive first MBS data related to the first MBS zone, the mobile apparatus comprising a processor and a transceiver, the communication method comprising the steps of:
(a) enabling the transceiver to read an indicator from a control channel allocation of a frame, wherein a content of the indicator comprises one of the following information: the cell-specific MBS configuration, the frame having the cell-specific MBS configuration, a size of a first MBS region of the frame, a first position of the first MBS region, and a next subframe having an MBS region, the control channel allocation being an allocation that a mobile apparatus has to read when it is in a power-saving mode and has to receive first MBS data, the frame being transmitted by a BS belonging to the first MBS zone, and the indicator being related to a cell-specific MBS configuration of the BS; and
(b) enabling the processor to derive the cell-specific MBS configuration according to the indicator in the control channel allocation without need to search the whole frame.

10. The communication method as claimed in claim 9, wherein the control channel allocation is selected form the group consisting of: a synchronous channel, a special synchronous channel, a broadcast channel, a paging advertisement, a downlink MAP, and an MBS MAP allocated in the frame.

11. The communication method as claimed in claim 9, wherein the cell-specific MBS configuration is one of an MBS zone boundary indicator, an MBS continuity indicator and a combination thereof.

12. The communication method as claimed in claim 9, wherein the indicator indicates that there is the cell-specific MBS configuration in the frame, and the step (b) comprises the steps of:
enabling the processor to read the first position of the first MBS region in the frame from the control channel allocation after reading the indicator; and
enabling the processor to read the cell-specific MBS configuration recorded in the first MBS region from the first position,
wherein the communication method further comprises the following steps of:
enabling the processor to read a second position of a second MBS region from the control channel allocation; and
enabling the processor to read the first MBS data recorded in the second MBS region from the second position.

13. The communication method as claimed in claim 9, wherein the indicator indicates the size of the first MBS region in the frame, and the step (b) comprises the steps of:
enabling the processor to read the first position of the first MBS region from the control channel allocation after reading the indicator; and
enabling the processor to read the cell-specific MBS configuration recorded in the first MBS region from the first position according to the size of the first MBS region,
wherein the communication method further comprises the following steps of:
enabling the processor to read a second position of a second MBS region in the frame from the control channel allocation; and
enabling the processor to read the first MBS data recorded in the second MBS region from the second position.

14. The communication method as claimed in claim 9, wherein contents of the indicator are the first position of the first MBS region in the frame, and the step (b) comprises the step of:

enabling the processor to, after reading the indicator, read the cell-specific MBS configuration recorded in the first MBS region from the first position, wherein the communication method further comprises the following steps of:

enabling the processor to read a second position of a second MBS region in the frame from the control channel allocation; and enabling the processor to read the first MBS data recorded in the second MBS region from the second position.

15. The communication method as claimed in claim 9, wherein the step (b) reads the cell-specific MBS configuration from the first MBS region in the frame according to the indicator, the first MBS region further records a position of a second MBS region of the frame, and the communication method further comprises the steps of:

enabling the processor to read an MBS MAP recorded in the second MBS region from the position of the second MBS region, wherein the second MBS region further records a position of a third MBS region in the frame; and enabling the processor to read the first MBS data recorded in the third MBS region from the position of the third MBS region.

16. The communication method as claimed in claim 9, wherein the BS and the mobile apparatus further belong to a second MBS zone, the step (b) reads the cell-specific MBS configuration from a third MBS region in the frame according to the indicator, the third MBS region further records the first position of the first MBS region and a second position of a second MBS region of the frame, and the communication method further comprises the steps of:

enabling the processor to read the first position and the second position recorded in the third MBS region;

enabling the processor to read a first MBS MAP and the first MBS data of the first MBS zone in the first MBS region from the first position; and enabling the processor to read a second MBS MAP and second MBS data of the second MBS zone in the second MBS region from the second position.

17. The communication method as claimed in claim 9, further comprising the steps of:

enabling the processor to determine that the mobile apparatus moves into signal coverage of another BS of a second MBS zone; and enabling the processor to update an MBS configuration of the mobile apparatus according to the cell-specific MBS configuration.

18. A BS for MBS, the BS belonging to a first MBS zone and comprising:

a processor, being configured to set an indicator in a control channel allocation of a frame, the indicator being related to a cell-specific MBS configuration of the BS, the control channel allocation being an allocation that a mobile apparatus has to read when it is in a power-saving mode and has to receive first MBS data, and the first MBS data being related to the first MBS zone; and a transceiver, being configured to transmit the frame so that the mobile apparatus can derive the cell-specific MBS configuration according to the indicator in the control channel allocation without need to search the whole frame after receiving the frame;

wherein a content of the indicator comprises one of the following information: the cell-specific MBS configuration, the frame having the cell-specific MBS configuration, a size of a first MBS region of the frame, a first position of the first MBS region, and a next subframe having an MBS region.

19. The BS as claimed in claim 18, wherein the control channel allocation is selected from the group consisting of: a synchronous channel, a special synchronous channel, a broadcast channel, a paging advertisement, a downlink MAP and an MBS MAP allocated in the frame.

20. The BS as claimed in claim 18, wherein the cell-specific MBS configuration is selected from one or more members of the group consisting of: an MBS zone boundary indicator and an MBS continuity indicator.

21. The BS as claimed in claim 18, wherein the processor is further configured to record the cell-specific MBS configuration into the first MBS region of the frame, the processor is further configured to record the first position of the first MBS region into the control channel allocation, the processor is further configured to record the first MBS data into a second MBS region of the frame, and the processor is further configured to record a second position of the second MBS region into the control channel allocation, wherein the indicator indicates that the frame has the cell-specific MBS configuration so that the mobile apparatus is able to read the first position, read the cell-specific MBS configuration from the first position, reads the second position, and read the first MSB data from the second position after the mobile apparatus reads the indicator.

22. The BS as claimed in claim 18, wherein the processor is further configured to record the cell-specific MBS configuration into the first MBS region of the frame, the processor is further configured to record the first position of the first MBS region into the control channel allocation, the processor is further configured to record the first MBS data into a second MBS region of the frame, and the processor is further configured to record a second position of the second MBS region into the control channel allocation, wherein the indicator indicates the size of the first MBS region so that the mobile apparatus is able to read the first position, read the cell-specific MBS configuration according to the first position and the size of the first MBS region, read the second position, and read the first MSB data from the second position after the mobile apparatus reads the indicator.

23. The BS as claimed in claim 18, wherein the processor is further configured to record the cell-specific MBS configuration into the first MBS region of the frame, the processor is further configured to record the first MBS data into a second MBS region of the frame, and the processor is further configured to record a second position of the second MBS region into the control channel allocation, wherein a content of the indicator is the first position of the first MBS region so that the mobile apparatus is able to read the cell-specific MBS configuration from the first position, read the second position, and read the first MSB data from the second position after the mobile apparatus reads the indicator.

24. The BS as claimed in claim 18, wherein the processor is further configured to record the cell-specific MBS configuration and a position of a second MBS region of the frame into the first MBS region of the frame, the processor is further configured to record an MBS MAP and a position of a third MBS region of the frame into the second MBS region, and the processor is further configured to record the first MBS data into the third MBS region so that the mobile apparatus is able to read the MBS MAP according to the position of the second MBS region and then reads the first MBS data according to the position of the third MBS region after the mobile apparatus derives the cell-specific MBS configuration according to the indicator.

25. The BS as claimed in claim 18, wherein the BS further belongs to a second MBS zone, the processor is further configured to record a first MBS MAP and the first MBS data of the first MBS zone into the first MBS region of the frame, the processor is further configured to record a second MBS MAP and second MBS data of the MBS zone into a second MBS region of the frame, and the processor is further configured to record the cell-specific MBS configuration, the first position of the first MBS region and a second position of the second MBS region into a third MBS region of the frame so that the mobile apparatus is able to read the first MBS MAP and the first MBS data according to the first position and then reads the second MBS MAP and the second MBS data according to the second position after the mobile apparatus derives the cell-specific MBS configuration according to the indicator.

26. A mobile apparatus for MBS, the mobile apparatus belonging to a first MBS zone, being in a power-saving mode, and having to receive first MBS data related to the first MBS zone, the mobile apparatus comprising:
 a transceiver, being configured to read an indicator from a control channel allocation of a frame, the control channel allocation being an allocation that a mobile apparatus has to read when it is in a power-saving mode and has to receive first MBS data, the frame being transmitted by a BS belonging to the first MBS zone, and the indicator being related to a cell-specific MBS configuration of the BS; and
 a processor, being configured to derive the cell-specific MBS configuration according to the indicator in the control channel allocation without need to search the whole frame;
 wherein a content of the indicator comprises one of the following information: the cell-specific MBS configuration, the frame having the cell-specific MBS configuration, a size of a first MBS region of the frame, a first position of the first MBS region, and a next subframe having an MBS region.

27. The mobile apparatus as claimed in claim 26, wherein the control channel allocation is selected from the group consisting of: a synchronous channel, a special synchronous channel, a broadcast channel, a paging advertisement, a downlink MAP, and an MBS MAP allocated in the frame.

28. The mobile apparatus as claimed in claim 26, wherein the cell-specific MBS configuration is selected from one or a combination of the members of the group consisting of: an MBS zone boundary indicator and an MBS continuity indicator.

29. The mobile apparatus as claimed in claim 26, wherein the indicator indicates that there is the cell-specific MBS configuration in the frame, the processor is configured to, after reading the indicator, read the first position of the first MBS region in the frame from the control channel allocation and read the cell-specific MBS configuration recorded in the first MBS region from the first position, the processor is further configured to read a second position of a second MBS region from the control channel allocation, and the processor is further configured to read the first MBS data recorded in the second MBS region from the second position.

30. The mobile apparatus as claimed in claim 26, wherein the indicator indicates the size of the first MBS region in the frame, the processor is configured to, after reading the indicator, read the first position of the first MBS region from the control channel allocation, the processor is configured to read the cell-specific MBS configuration recorded in the first MBS region from the first position according to the size of the first MBS region, the processor is further configured to read a second position of a second MBS region in the frame from the control channel allocation, and the processor is further configured to read the first MBS data recorded in the second MBS region from the second position.

31. The mobile apparatus as claimed in claim 26, wherein contents of the indicator are the first position of the first MBS region in the frame, the processor is configured to, after reading the indicator, read the cell-specific MBS configuration recorded in the first MBS region from the first position, the processor is further configured to read a second position of a second MBS region in the frame from the control channel allocation, and the processor is further configured to read the first MBS data recorded in the second MBS region from the second position.

32. The mobile apparatus as claimed in claim 26, wherein the processor is configured to read the cell-specific MBS configuration from the first MBS region in the frame according to the indicator, the first MBS region further records a position of a second MBS region in the frame, the processor is further configured to read an MBS MAP recorded in the second MBS region from the position of the second MBS region, the second MBS region further records a position of a third MBS region in the frame, and the processor is further configured to read the first MBS data recorded in the third MBS region from the position of the third MBS region.

33. The mobile apparatus as claimed in claim 26, wherein the BS and the mobile apparatus further belong to a second MBS zone, the processor is configured to read the cell-specific MBS configuration from a third MBS region in the frame according to the indicator, the processor is further configured to read the first position of the first MBS region in the frame and a second position of a second MBS region in the frame from the third MBS region, the processor is further configured to read a first MBS MAP and the first MBS data of the first MBS zone in the first MBS region from the first position, and the processor is further configured to read a second MBS MAP and second MBS data of the second MBS zone in the second MBS region from the second position.

34. The mobile apparatus as claimed in claim 26, wherein the processor is further configured to determine that the mobile apparatus moves into signal coverage of another BS of a second MBS zone, and the processor is further configured to update an MBS configuration of the mobile apparatus according to the cell-specific MBS configuration.

* * * * *